United States Patent [19]

Trevelyan et al.

[11] Patent Number: 4,887,553
[45] Date of Patent: Dec. 19, 1989

[54] ANIMAL HEAD RESTRAINT

[75] Inventors: James P. Trevelyan, Nedlands; Andrew M. Whitehead, Heathridge, both of Australia

[73] Assignee: The University of Western Australia, Nedlands, Australia

[21] Appl. No.: 231,012

[22] Filed: Aug. 11, 1988

[30] Foreign Application Priority Data

Aug. 11, 1987 [AU] Australia .................. PI3695

[51] Int. Cl.⁴ .......................................... A01K 29/00
[52] U.S. Cl. .................................................. 119/154
[58] Field of Search .................. 119/96, 98, 129, 151, 119/153, 154; 292/53, 258

[56] References Cited

U.S. PATENT DOCUMENTS

| 433,356 | 7/1890 | Long | 119/153 |
| 465,069 | 12/1891 | Reid | 119/154 |
| 548,653 | 10/1895 | Okey | 119/154 |
| 824,402 | 6/1906 | Betz et al. | 119/153 |
| 868,690 | 10/1907 | O'Kane | 119/154 X |
| 913,619 | 2/1909 | Church | 119/154 |
| 1,057,615 | 4/1913 | Blackburn | 119/96 |
| 1,270,647 | 6/1918 | Miller | 119/154 |
| 1,430,847 | 10/1922 | Pennington | 119/153 |
| 1,950,757 | 3/1934 | Smith et al. | 119/154 X |

FOREIGN PATENT DOCUMENTS

| 493776 | 6/1953 | Canada | 119/129 |
| 2409004 | 7/1979 | France | 119/154 |
| 1367927 | 1/1988 | U.S.S.R. | 119/98 |

Primary Examiner—Robert Peshock
Assistant Examiner—R. Thomas Price
Attorney, Agent, or Firm—Cushman, Darby & Cushman

[57] ABSTRACT

A head restraint for animals such as sheep, comprising a support carrying arms for engaging the bridge of the snout and the lower jaw to clamp the jaws in a closed position, arms carried by the support, the arms carrying caps which in use cover the eye of the animal, each cap having a lug which engages a cavity in the skull of the sheep just behind each eye socket.

10 Claims, 3 Drawing Sheets

ANIMAL HEAD RESTRAINT

FIELD OF THE INVENTION

This invention relates to improvements in head restraints for animals, such as sheep, during processes, such as automated shearing processes, in which the head of the animal must be restrained against any substantial movement.

BACKGROUND OF THE INVENTION

In our copending Australian Patent Application No. AU-A33725/84 and New Zealand Patent Application No. 221095 we describe a mechanism for restraining and manipulating a sheep during an automated shearing process. The mechanism includes a device for restraining the head of the sheep in which the lower jaw of the sheep was clamped between a bar inserted in the mouth of the sheep and lower jaw engaging means having fingers which extended within the lower jaw bone of the sheep. The device is the subject of copending Austrailian Patent Application No. AU-A33725/84 and New Zealand Patent Application No. 221095. While this device provides a degree of restraint of the head of the animal, it has been found that the restraint is not sufficiently rigid in that the head of the sheep is allowed to tilt and rotate to a certain extent when the animal struggles. While it will be appreciated that complete restraint of the head of the sheep is not practicable, a more effective restraint than the restraint provided by this device is required.

SUMMARY OF THE INVENTION AND OBJECTS

It is an object of the present invention to provide a head restraint for an animal, and particularly for a sheep, in which the head of the animal is more positively restrained.

In accordance with the present invention there is provided a head restraint for an animal comprising a support structure carrying means for engaging the upper and lower jaws of the animal, a pair of arms pivoted on the support structure, the arms including lugs projecting from the free ends of there of and positioned to engage predetermined cavities in the skull structure of the animal, means for pivoting said arms so as to engage the skull cavities, whereby the head of the animal is firmly restrained by the combined action of said means engaging the upper and lower jaws of the animal and the lugs engaging said skull cavities.

Where the head restraint is adapted for use with a sheep, the lugs on said arms engage cavities in the skull of the sheep just behind each eye socket. It has been found that these cavities may be engaged quite positively without distressing the sheep and the engagement serves to firmly anchor the position of the head with respect to the arms. The means engaging the upper and lower jaws of the sheep prevent rotational movement of the head with respect to the points of engagement by the lugs and in this manner the head restraint effectively prevents movement of the head with respect to the support structure.

In a preferred embodiment of the invention, the arms also carry eye caps which are either independently associated with the lugs or form part of the lug structure. The eye caps are preferably positioned on the arms so that the periphery of the cap engages the head of the sheep surrounding each eye whereby the eyes of the sheep are effectively covered. It will be appreciated that sheep become quite docile when their eyes are covered and this assists in restraining the animal against movement during the processes to be performed on the animal.

The means engaging the upper and lower jaws of the animal may take any suitable form and in one embodiment a pad is positioned on the support structure to engage the bridge of the snout of the sheep while a bar is pivotally mounted on the support to engage the lower jaw of the animal whereby the jaws are effectively clamped in a closed position. In one particularly preferred form, the pad is rigidly secured to the support structure while the bar is pivotally mounted on the support structure to be actuated either by the means for closing the arms on the skull of the sheep or by independent means, such as a biasing spring or independent hydraulic means, which pivots the bar towards the lower jaw of the sheep in opposition to the pad engaging the bridge of the snout.

Each eye cap is preferably shaped so that the wool on the head of the sheep is accessible for shearing and the edge of the eye cap may be padded or otherwise protected to avoid injury to the animal.

BRIEF DESCRIPTION OF THE DRAWINGS

One presently preferred experimental form of the head restraint embodying the invention will now be described with reference to the accompanying drawings in which.

DESCRIPTION OF PREFERRED EMBODIMENTS

Figure 1:
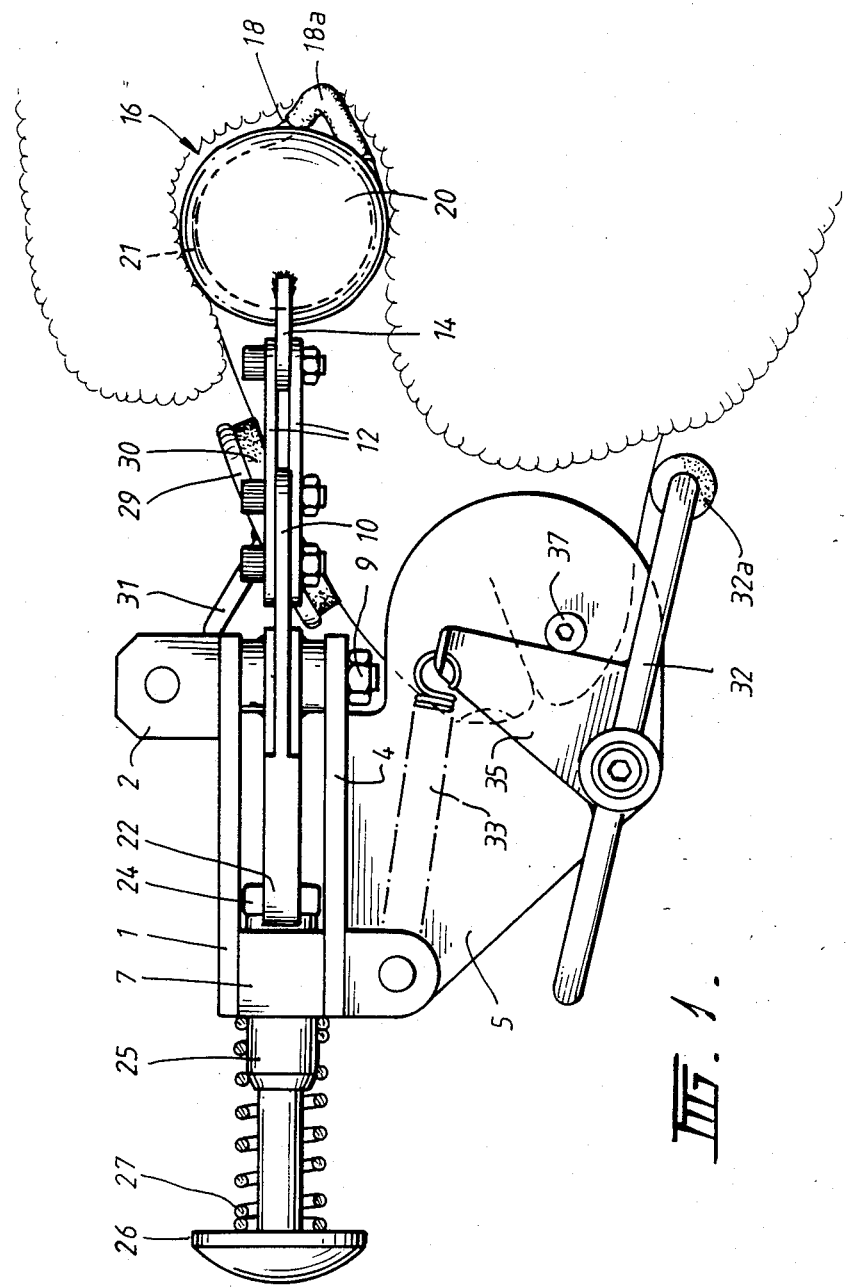
FIG. 1 is a side elevation of the head restraint in position on a sheep's head.

Referring to the drawings, the head restraint embodying the invention will be seen to comprise a top plate 1 having a pair of upstanding lugs 2, 3, by means of which the restraint may be manipulated by independent means (not shown), a bottom plate 4 having a pair of downwardly depending side plates 5 and 6 secured thereto, the top and bottom plates being held together in spaced relationship by a spacer block 7 at one end of the plates and by bearings 8 at the other end, through which clamping bolts 9 pass.

A pair of second actuator arms 10, 11 are pivotally supported on the bearings 8 and carry adjustable extension arms 12, 13 to the three ends of which are adjustably attached mounting lugs 14, 15 extending from eye caps 16, 17 having shaped securing lugs 18, 19 extending from their free ends. It will be appreciated that the adjustable nature of the extension arms, 12, 13 and the adjustable securement of the eye caps 16, 17 thereto is for experimental purposes and these components may be rigidly formed in any commercial embodiment of the invention.

Figure 2:
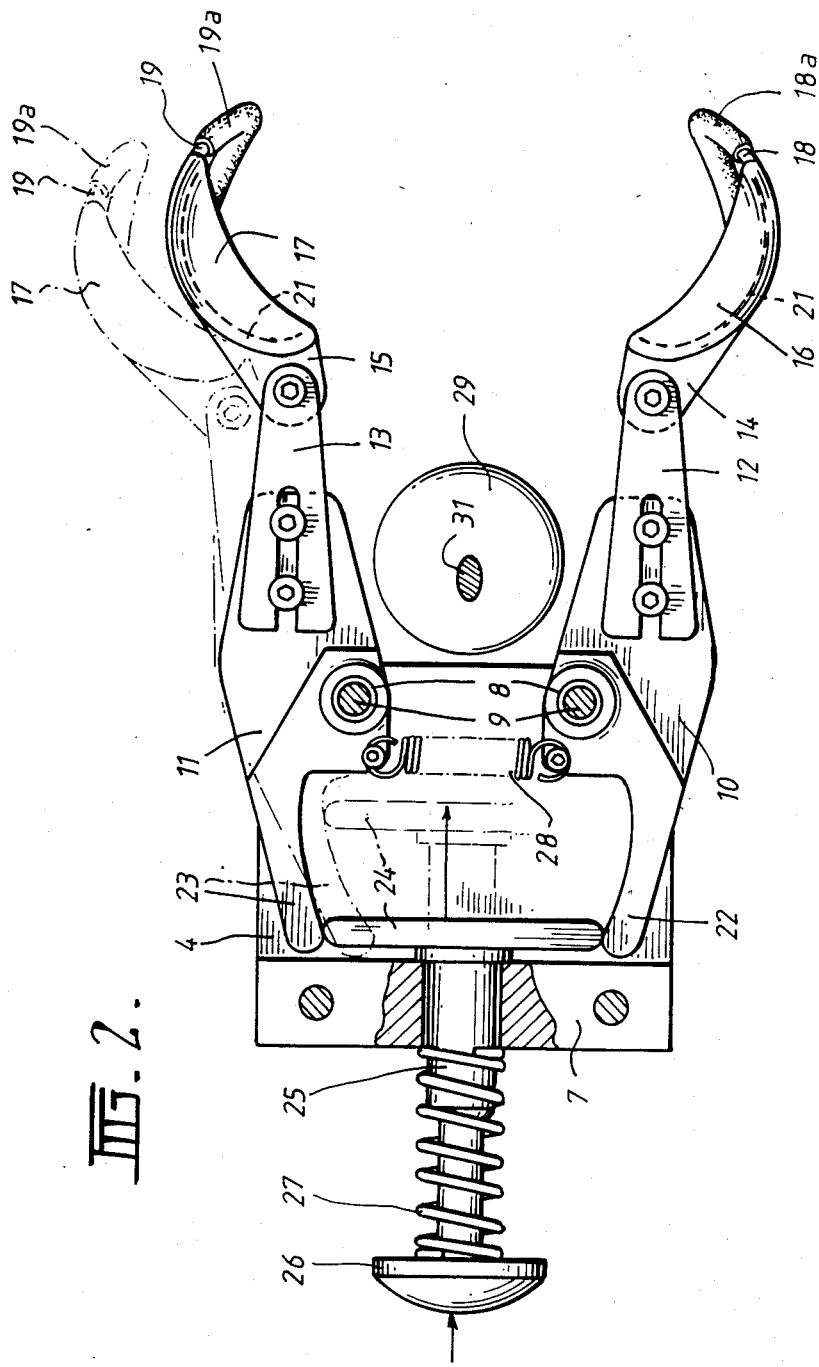
FIG. 2 is a plan view of the restraint with parts removed for extra clarity.
Figure 3:
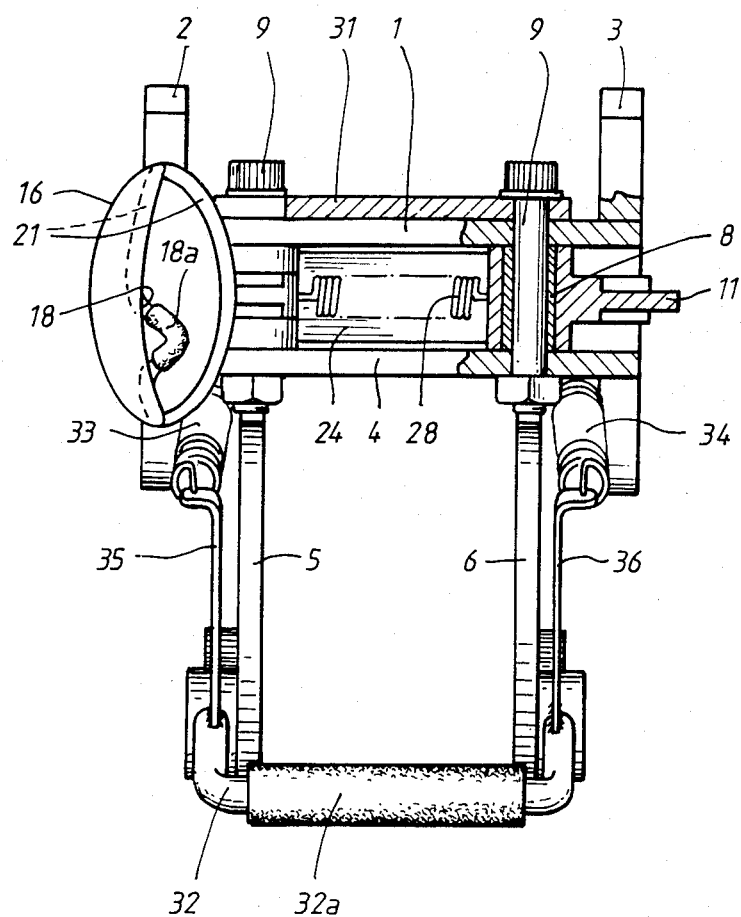
FIG. 3 is a fragmentary sectional end elevation of the restraint.

As shown most clearly in FIG. 2 of the drawings, each eye cap comprises a generally cup shaped member 20 to which the attachment lug 14 is welded, the shaped rod definging the securing lugs 18 and 19 being similarly welded to the opposite end of the cup 20. Around the periphery of the cup, a shaped rod rim 21 is secured to ensure that the cup 20 may properly seat on the head of the sheep surrounding the eye socket. The lugs 18 and 19 are shown with resilient material 18a and 19a, say of sponge rubber or the like. If desired, simila resilient covering material may be applied around the entire rim 21 of each cup 20 to protect against injury and to further exclude light from the eyes.

The opposite ends of the arms 10 and 11 are formed with shaped cam portions 22, 23 which are engaged by a cam follower 24 attached to the end of a plunger 25 mounted for movement within a bore formed in the spacer 7 and having an actuating knob 26 against which a compression spring 27 bears to bias the plunger 25 towards its operative position. A tension spring 28 engages pins attached to the arms 10 and 11 and tends to bias the arms 10 and 11 apart. Thus, by pushing on the knob 26 against the action of the spring 27, the plunger 25 and follower 24 move inwardly of the cam portions 22, 23 and the spring 28 moves the arms 10 and 11 to their open position in which the lugs 18 and 19 and the eye caps 16 and 17 are released from the sheep's head.

To restrain the sheep's head against rotary movement with respect to the top and bottom plates 1 and 4, a snout engaging pad 29 having a foam protective lining 30 is rigidly attached to the top plate 1 by a connecting plate 31. It will be appreciated that the pad, 30 will firmly engage the bridge of the nose of the sheep when the securing lugs 18 and 19 are engaged with the skull cavities behind the eye sockets to partly prevent rotary movement of the sheep's head with respect to the plates 1 and 4.

To further restrain rotary movement of the sheep's head, an open rectangular lower jaw clamping bar 32 is pivoted to the side plates 5 and 6 so that the bar 32 may engage under the lower jaw of the sheep in the manner shown in FIG. 1 of the drawings. The bar 32 preferably carries a resilient roller of sponge rubber or the like to reduce the likelihood of injury. In the present embodiment, the necessary pivotal movement of the bar with respect to the plates 5 and 6 is achieved by means of tension springs 33 and 34 engaging lever arms 35 and 36 rigidly secured to the clamping bar 32 in the manner shown in the drawings. A pair of stops 37 extend from each of the side plates 5 and 6 to limit the extent of rotation of the lever arms 35 and 36 in both directions.

In use, the clamp is applied to the head of a sheep by firmly pushing the release knob 26 to open the arms 10 and 11, at the same time gripping the lower jaw clamping bar 32 to pivot it against the action of the springs 33, 34 to its open position. When the sheep's head is in position, the plunger 25 is released gently to allow the eye covers 16 and 17 and the securing lugs 18 and 19 to engage the head of the sheep in the required position. The bar 32 is then released and engages the lower jaw of the sheep and the sheep's head is then firmly located and restrained by the securing lugs 18 and 19, the nose pad 29, 30 and the bar 32. The eye caps 16 and 17 cover the eyes of the sheep thereby pacifying the sheep and reducing the amount its struggles. To release the sheep's head, the knob 26 is pushed against the spring 27 thereby opening the arms 10 and 11 and releasing the securing lugs 18 and 19 from the skull cavities. The sheep may then withdraw its head from its position between the nose pad 29, 30 and the lower jaw clamping bar 32.

While in the above described embodiment the lower jaw clamping bar 32 is separately actuated against the action of the spring 33, it will be appreciated that the actuation of the bar 32 may be linked to the actuation of the plunger 25 so that depression of the plunger 25 also causes pivotal movement of the bar 32 against the action of the springs 33 and 34. Similarly, while the securing lugs 18 and 19 are shown as being attached to the eye caps 16 and 17, the lugs 18 and 19 may form an integral part of the arms 10 and 11 with the eye caps 16 and 17 independently mounted on the arms 10 and 11 in any suitable manner. As mentioned above, the extensions 12 and 13 are temporary experimental extensions and will in any commercial embodiment form part of the arms 10 and 11.

While the means for actuating the arms 10 and 11 as described above is presently preferred, any other suitable means of causing the required pivotal movements of the arms may be used.

We claim:

1. A head restraint for an animal comprising:
   a support structure;
   upper and lower jaw engaging means mounted on said support structure;
   a pair of arms pivotally mounted on said support structure, each of said arms including a free end from which a lug projects, said lug being positioned to engage a depression in the animal's skull structure, said depression being located between an eye socket and an ear of the animal, when the jaw engaging means are engaged with upper and lower jaws of the animal; and
   means for pivoting said arms so as to engage said skull depressions and for holding said arms with said lugs in engagement with said depressions, whereby the head of the animal is firmly restrained by combined action of said upper and lower jaw engaging means and the lugs engaging said skull depressions.

2. The restraint of claim 1, wherein said animal is a sheep.

3. The restraint of claim 2, wherein said arms carry caps which cover the eyes of the animal.

4. The restraint of claim 3, wherein said caps are generally dome-shaped and have a peripheral edge positioned to engage the head of the animal surrounding each eye whereby the eyes are effectively covered.

5. The restraint of claim 1, wherein said arms carry caps which cover the eyes of the animal.

6. The restraint of claim 5, wherein said caps are generally dome-shaped and have a peripheral edge positioned to engage the head of the animal surrounding each eye whereby the eyes are effectively covered.

7. The restraint of claim 6, wherein said cap edges are padded.

8. The restraint of claim 1, wherein said upper jaw engaging means comprises a pad member rigidly carried by said supportable structure.

9. The restraint of claim 8, wherein said lower jaw engaging means comprises a bar in use extending transversely of the jaw and pivoted to the support structure, and means for biasing said bar towards a jaw engaging position.

10. The restraint of claim 1, wherein said means for pivoting said arms to a head engaging position comprise a cam follower engaging cam faces on said arms, said cam follower being biased to head engaging position and said arms being biased to a head disengaging position.

* * * * *